United States Patent
Ogawa et al.

(10) Patent No.: US 9,253,012 B2
(45) Date of Patent: Feb. 2, 2016

(54) PATH SELECTION DEVICE, PROGRAM AND METHOD

(75) Inventors: Masatsugu Ogawa, Tokyo (JP); Yuma Matsuda, Tokyo (JP); Masafumi Yano, Miyagi (JP)

(73) Assignee: NEC CORPORATION, Tokyo (JP)

( * ) Notice: Subject to any disclaimer, the term of this patent is extended or adjusted under 35 U.S.C. 154(b) by 322 days.

(21) Appl. No.: 13/883,958

(22) PCT Filed: Nov. 11, 2011

(86) PCT No.: PCT/JP2011/076600
§ 371 (c)(1),
(2), (4) Date: May 7, 2013

(87) PCT Pub. No.: WO2012/067210
PCT Pub. Date: May 24, 2012

(65) Prior Publication Data
US 2013/0238815 A1    Sep. 12, 2013

(30) Foreign Application Priority Data
Nov. 19, 2010 (JP) .................. 2010-259345

(51) Int. Cl.
| | |
|---|---|
| G06F 15/173 | (2006.01) |
| H04L 29/08 | (2006.01) |
| H04L 12/721 | (2013.01) |
| G01C 21/34 | (2006.01) |
| G06Q 10/04 | (2012.01) |

(52) U.S. Cl.
CPC ............ *H04L 29/08* (2013.01); *G01C 21/3446* (2013.01); *G06Q 10/047* (2013.01); *H04L 45/14* (2013.01); *H04L 45/34* (2013.01); *H04L 67/14* (2013.01)

(58) Field of Classification Search
CPC ........................................................ H04L 29/08
USPC ............................................................ 709/244
See application file for complete search history.

(56) References Cited

FOREIGN PATENT DOCUMENTS

| | | | |
|---|---|---|---|
| EP | 1564938 A1 | | 8/2005 |
| JP | 2004304669 A | | 10/2004 |
| JP | 2005064724 A | | 3/2005 |
| JP | 2005229624 A | * | 8/2005 |
| JP | 2009-141425 A | | 6/2009 |
| JP | 2009141425 A | * | 6/2009 |
| JP | 2010-41429 A | | 2/2010 |

OTHER PUBLICATIONS

Yamamoto, Hiroshi; An Inter-Networking Mechanism Using Stepwise Synchronization for Wireless Sensor Networks; May 14, 2010; vol. 110, pp. 17-20.*

(Continued)

*Primary Examiner* — Glenford Madamba
(74) *Attorney, Agent, or Firm* — Sughrue Mion, PLLC

(57) ABSTRACT

A start node acquires coupled state information indicating a connectibility of nodes from a network. By executing simulation in accordance with a computational model constructed based on the coupled state information, the start node determines for each node a first link that transmitted an oscillation or a signal first to the node. A path that extends from a target node to the start node via the first link of intermediate nodes is selected.

22 Claims, 13 Drawing Sheets

(56) References Cited

OTHER PUBLICATIONS

Taniguchi, Yoshiaki et al, "A Distributed and Self-organizing Communication Mechanism based on Traveling Wave Phenomena for Wireless Sensor Networks", IEICE Technical Report, Jul. 12, 2006, pp. 17-20, vol. 106, No. 167.

Yamamoto, Hiroshi et al, "Proposal and evaluation of an inter-networking mechanism using stepwise synchronization for wireless sensor networks", IEICE Technical Report, May 14, 2010, pp. 17-20, vol. 110, No. 50.

Office Action dated Apr. 2, 2014, issued by the Japan Patent Office in corresponding Japanese Application No. 2012-544312.

\* cited by examiner (a) DETECTION BY AMPLITUDE (b) DETECTION BY PERIOD

NETWORK USED FOR COMPUTATION
(① AND THE LIKE ARE LINK NUMBERS)

PATH SELECTION DEVICE, PROGRAM AND METHOD

CROSS REFERENCE TO RELATED APPLICATIONS

This application is a National Stage of International Application No. PCT/JP2011/076600 filed Nov. 11, 2011, claiming priority based on Japanese Patent Application No. 2010-259345 filed Nov. 19, 2010, the contents of all of which are incorporated herein by reference in their entirety.

TECHNICAL FIELD

This invention relates to a path selection method for a network including a plurality of nodes and a plurality of links, such as an information network or a traffic network, and more particularly, to simulation of required time for each path in a modeled network, and the required time.

BACKGROUND ART

There has conventionally been considered a path selection problem in a network as a search for a shortest path connecting two points. Representative types of the network include a traffic network regarding traffic of cars and the like, and an information network regarding information communication.

The most famous method for shortest path search is the Dijkstra method. The Dijkstra method is an algorithm that is substantially optimum in terms of a computational theory, but in a case of application to a real problem, has a problem in that, when a shortest path connecting distant points is to be determined, the problem cannot be solved in realistic time because many parts of map information (map data) need to be accessed, for example. An image of the algorithm of the Dijkstra method is to gradually determine a shortest path from a start node (starting point) to a neighboring node, and when arriving at a target node (destination) and there is no probability that another path is the shortest path, end the computation.

In order to solve this problem, some approaches have been taken.

As a most simple method of decreasing the computation time, there is a method of performing the Dijkstra method from both a start point and an end point to narrow down a search range. There is also a method called the A* algorithm for preferentially searching a direction with a smaller straight-line distance to the destination. Those methods are reduced in computation time as compared to the Dijkstra method, but still have a problem in that an enormous amount of time is needed for large-scale data.

Another method is a heuristic method of assuming that when moving between distant areas, a kind of predetermined route is taken, to thereby omit the intermediate search. As a subspecies, there is also a method of forming roads into a hierarchy of a network including roads used for traveling a long distance, such as expressways and highways, and a network including the other roads, and after first determining the shortest path from each of the current position and the destination to the nearest highway, solving the shortest path problem on the highway. Those can be considered as approaches that give up on optimization.

In recent years, there have been adopted approaches in which, for example, a certain kind of preprocessing is performed on the map information (map data) so as to find a solution in a short time when the shortest path is determined later. The most famous of those approaches are the bit vector method and the highway hierarchy method.

In the bit vector method, the map is divided into several areas, and for a set of each node and an area, from among links connecting to the node, a used link for use by the shortest path from the vertex to the node in the area is selected in advance. In searching for the shortest path, the searching is omitted by searching only the used link in a direction from a desired node to an area including the destination. The problems are that the preprocessing takes time and that an increase in memory is caused by storing the used link and the like.

In the highway hierarchy method, links for long distance are determined in advance so that a link for long distance is reached in k links from a start node, and after getting off the link for long distance, the target node is reached in k links. In other words, the link for long distance satisfying the above-mentioned conditions are determined in advance in the approach. The approach is advantageous in that the preprocessing ends when the shortest path is determined only for nodes that are within 2k+1 links from each node, and hence the preprocessing time is shorter than the other approaches. The problem is that there is no guarantee that the network contains the link for long distance.

The technologies of shortest path search have been outlined above, and have been working with some success in a network in which nodes and links are stable to some extent as in the traffic network. However, in the case of the information network in which the relationship between nodes and links changes dynamically, it is difficult to adapt the above-mentioned algorithms in a simple manner. For example, in the case of the information network, the preprocessing and the like cannot be performed realistically. This is because the preprocessing requires a somewhat stable network (that changes little with time) as a precondition.

As a shortest path search for the information network, the following approach has been conventionally used.

The shortest path search generally used in a large scale information network is a path control protocol called Open Shortest Path First (OSPF). This protocol uses the Dijkstra algorithm. This OSPF has a feature in that, while the routers exchange copies of the entire path tables of their own in the conventional distance-vector path control protocol, the routers exchange only the link states and each router computes the shortest path. Therefore, the OSPF has an advantage that the amount of data to be exchanged between the routers is significantly small as compared to the conventional distance-vector algorithm and hence the amount of data exchange can be made smaller irrespective of the scale of the network system.

In actual operation, the OSPF performs the path selection by dividing an autonomous system (AS), which is a set of operating routers, into a plurality of areas so that all routers belonging to one area are configured to have the same link state database and each of the routers computes the shortest path from the router to all the destination based on the link state database.

However, the OSPF performs the shortest path computation with the little computational resource of the router, and hence has had problems in that the restriction in computational resource limits the area and does not allow the shortest path computation to be performed frequently. In the case of the information network, the network status changes dynamically as compared to the traffic network, and hence while the shortest path computation essentially needs to be performed in real time if possible, such ideal situation is hard to achieve.

In addition, irrespective of whether the relationship between the nodes and the links is stable in time, the shortest path computations are common in determining the shortest path by computing and comparing the lengths of the paths.

Literatures describing the technologies relating to this invention include Japanese Patent Application Laid-open Nos. 2009-141425 and 2010-041429 (hereinafter referred to as Patent Literatures 1 and 2, respectively). The technologies disclosed in those patent literatures are both technologies involving transmitting a search packet to the real network and selecting the path based on the state of the packet. According to such methods, in order to grasp the network state of the entire path, there is a need to actually transmit to the network the number of packets corresponding to the scale of the network and then observe the state. Therefore, it is considered that applying such technologies to a large-scale network to select a path is difficult.

DISCLOSURE OF THE INVENTION

Problem to be Solved by the Invention

As described above, the conventional shortest path search algorithms have the problem in that the computation takes time or the enormous computational resources are consumed. Therefore, especially in equipment such as the router in which the computational resources are limited, it has been impossible to search for the shortest path and select the path in real time. This is an important problem especially in an information network in which the network state changes dynamically, and causes a problem in that a network response that is satisfactory to the user cannot be provided due to the information transmission delay.

In recent years, the information network is continuously expanding. This means that the shortest path search becomes more difficult, which leads to the expectation that the users' convenience is compromised year after year. This invention has been devised in view of the above-mentioned situation, and provides a technology for significantly reducing the computational time and the computational resources of the conventional shortest path search.

Solution to Problem

In order to solve the above-mentioned problem, according to an aspect of this invention, there is provided a path selection device, including: network information acquisition means for acquiring, by a start node which is a source of an oscillation or a signal to be simulated regarding a transmission process in a network and is one node in the network, coupled state information of the network indicating a connectibility of nodes in the network from the network; network state analysis means for determining, by an arithmetic unit of the start node executing the simulation in accordance with a computational model constructed based on the coupled state information, when n (n is a natural number) links connected to the one node in the network are called a first link, a second link, . . . , an n-th link in order from a link that has transmitted the oscillation or the signal first to the one node, at least the first link for each of the nodes in the network; and network path selection means for selecting by the start node a path that extends from a target node, which is one node in the network other than the start node, to the start node via the first link of intermediate nodes as a desired path between the start node and the target node.

Further, according to another aspect of this invention, there is provided a program for causing a computer to function as: network information acquisition means for acquiring, by a start node which is a source of an oscillation or a signal to be simulated regarding a transmission process in a network and is one node in the network, coupled state information of the network indicating a connectibility of nodes in the network from the network; network state analysis means for determining, by an arithmetic unit of the start node executing the simulation in accordance with a computational model constructed based on the coupled state information, when n (n is a natural number) links connected to the one node in the network are called a first link, a second link, . . . , an n-th link in order from a link that has transmitted the oscillation or the signal first to the one node, at least the first link for each of the nodes in the network; and network path selection means for selecting by the start node a path that extends from a target node, which is one node in the network other than the start node, to the start node via the first link of intermediate nodes as a desired path between the start node and the target node.

Further, according to still another aspect of this invention, there is provided a path selection method, including the steps of: acquiring, by a start node which is a source of an oscillation or a signal to be simulated regarding a transmission process in a network and is one node in the network, coupled state information of the network indicating a connectibility of nodes in the network from the network; determining, by an arithmetic unit of the start node executing the simulation in accordance with a computational model constructed based on the coupled state information, when n (n is a natural number) links connected to the one node in the network are called a first link, a second link, . . . , an n-th link in order from a link that has transmitted the oscillation or the signal first to the one node, at least the first link for each of the nodes in the network; and selecting, by the start node, a path that extends from a target node, which is one node in the network other than the start node, to the start node via the first link of intermediate nodes as a desired path between the start node and the target node.

Effect of the Invention

According to this invention, it is possible to provide the path selection method and device which require fewer resources and perform computation at high speed. This also allows a path selection to be performed in a network with high flexibility (enormous number of nodes and links). In addition, the path selection method may be executed at high frequency, and hence an appropriate path selection may be executed even in a network in which the situation changes dynamically.

BEST MODE FOR EMBODYING THE INVENTION

Figure 1:
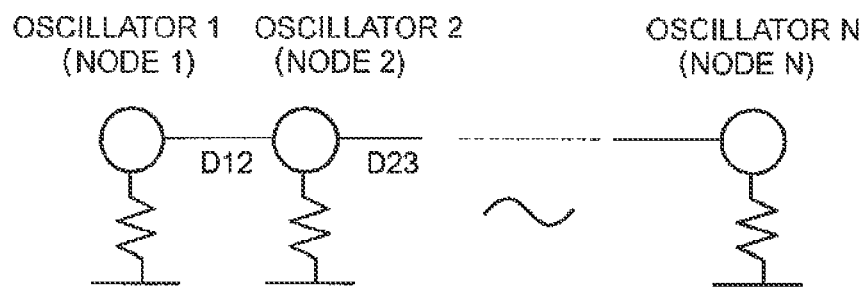
FIG. 1 is a diagram illustrating a path selection method according to an embodiment of this invention, and illustrates a network in which a plurality of nodes, which are likened to oscillators, are connected in series.

In a path selection method of this invention, lengths of paths in a network are not compared to determine the shortest path, and the lengths of the paths do not need to be directly computed. According to the path selection method of this invention, a start node in the network is likened to an oscillator or a signal source, and a process in which an oscillation/signal is transmitted from the start node to other nodes is simulated on a computer, to thereby determine a link through which the oscillation/signal is transmitted first to the node.

In a network system of this invention, each node in the network performs a path selection. Moreover, prior to the path selection, each node functions on a precondition that information on an overall image of the network has been acquired correctly to some extent from the network. This precondition is the same as that in the OSPF described above. The overall image information of the network specifically includes topology (structure) information of the network and coupled state information of the network. Those pieces of information are hereinafter also simply referred to as overall image information, topology information, and coupled state information, respectively. The "coupled state information of the network" refers to information indicating a coupled state of the network or a connectibility of the nodes, and includes, for example, a distance of a link between certain nodes, an upper limit (capacity) of an information flow through the link between the certain nodes, and a speed of the information flow through the link between the certain nodes. In this embodiment, as the coupled state information, the use of the distance between the nodes is mainly described, but a person skilled in the art could easily understand that general physical quantities regarding the coupled state of the network can be used. Moreover, the description is given herein assuming an information network, but the same applies to other networks such as a traffic network.

The phrase "to some extent" is used herein because as the network becomes larger, it becomes more difficult to share latest information between distant nodes, which makes it difficult to know the overall image of the network correctly at a certain time. In addition, when the link status (connectibility) changes every minute as in the information network, it is also difficult to know the overall image of the network correctly. According to this invention, an effective path search can be performed even when the overall image information of the network is not always perfect. The reason is described later.

First Embodiment

The path selection method according to a first embodiment of this invention is described based on a network system 1. This is the most basic form of the invention of the subject application. The network system 1 is a network in which N (N is a natural number) nodes: Node 1, Node 2, . . . , Node N are connected in the stated order in series. Each of Node 1, Node 2, . . . , Node N is equipment including an arithmetic processing unit, and more specifically, equipment such as an access server of an internet access provider or a router. Each of the nodes of the network executes the following path selection method.

As described above, the nodes know the overall image of the network correctly to some extent, and based on the overall image, constructs a computational model as illustrated in FIG. 1 to perform a path computation. In this embodiment, the distance between the nodes is used as the coupled state information, which is an example of a path computation of a shortest path. When the coupled state information is a reciprocal of flowability of the information flow or the like, the path computation of the fastest information transmission path is performed. For simple description, FIG. 1 is a diagram in which the invention of the subject application is applied to a network in which a plurality of nodes are arrayed in line. Each of the nodes is connected to an adjacent node via only one link. Nonlinear oscillators are provided to a position corresponding to the nodes.

In this embodiment, a Van der Pol oscillator is assumed as the nonlinear oscillator, and the distance of the link connecting the nodes is replaced by a diffusion coefficient D of the oscillation. The oscillator is not limited to the Van der Pol oscillator, and various oscillators may be used instead. The coupled state information has a predetermined relationship with the diffusion coefficient D, and in this embodiment, the distance (length) of the link needs to be converted to the diffusion coefficient D with some function. In this embodiment, on the analogy of thermodynamics, the diffusion of the oscillation of the oscillator is expressed by a diffusion equation. The equation expressing the diffusion of the oscillation of the oscillator may be another equation as long as the diffusion of the oscillation may be described. As a result, the network of the nonlinear oscillators of FIG. 1 may be described by the following equation.

$$\left.\begin{array}{l}\frac{\partial x(r,t)}{\partial t}=\varepsilon\left(x-\frac{x^3}{3}\right)-y+D_{ij}\frac{\partial^2 x}{\partial r^2}\\\frac{\partial y(r,t)}{\partial t}=\alpha^2(r)x\end{array}\right\}$$ (Math. 1)

In the equation, D with the index ij represents the diffusion coefficient between the i-th node and the j-th node. The term with Dij represents a relationship between Oscillator i and Oscillator j. $\varepsilon$ and $\alpha$ are parameters determining the characteristics of the oscillation. In the above equation, x represents an amplitude of the oscillator, y is a term physically representing an effect of a spring and represents the spring, and r represents a position of the oscillator. t represents time. Following such equation that is capable of describing the diffusion of the oscillation as Equation 1, motions of all the oscillators are simulated by considering that Oscillator 1, Oscillator 2, . . . , Oscillator N respectively corresponding to Node 1, Node 2, . . . , Node N of the network move. When an initial value of the oscillator corresponding to the node at a starting point is changed, the oscillation is started. Motions of the oscillators corresponding to the nodes other than the starting point are also subject to the above equation, and hence the oscillation of the oscillator of the node at the starting point is transmitted sequentially to the other oscillators depending on a transmission state of the oscillation represented by the term of Dij. At this time, the link that transmits the oscillation first to the node is determined for each of the nodes, and based on those determination results, the shortest path from the start node to each of the nodes is determined.

After setting the computational model as described above and then setting an external force or the initial value of the nonlinear oscillator of the start node (the node corresponding to the own node that performs the computation), the nonlinear oscillator starts the oscillation. When $\varepsilon$ and $\alpha$ are appropriately set in advance, the oscillation converges to a fixed oscillation called a limit cycle irrespective of the external force and the initial value.

The oscillation that has occurred in the start node is transmitted to the surrounding nodes via the links having the diffusion coefficient D, and the nonlinear oscillators surrounding the start node eventually start the oscillation. The time at which the surrounding nonlinear oscillators start the oscillation is equal to the time at which a phase of the oscillation of the start node arrives, and hence the nodes closer to the start node start the oscillation earlier.

Figure 2:
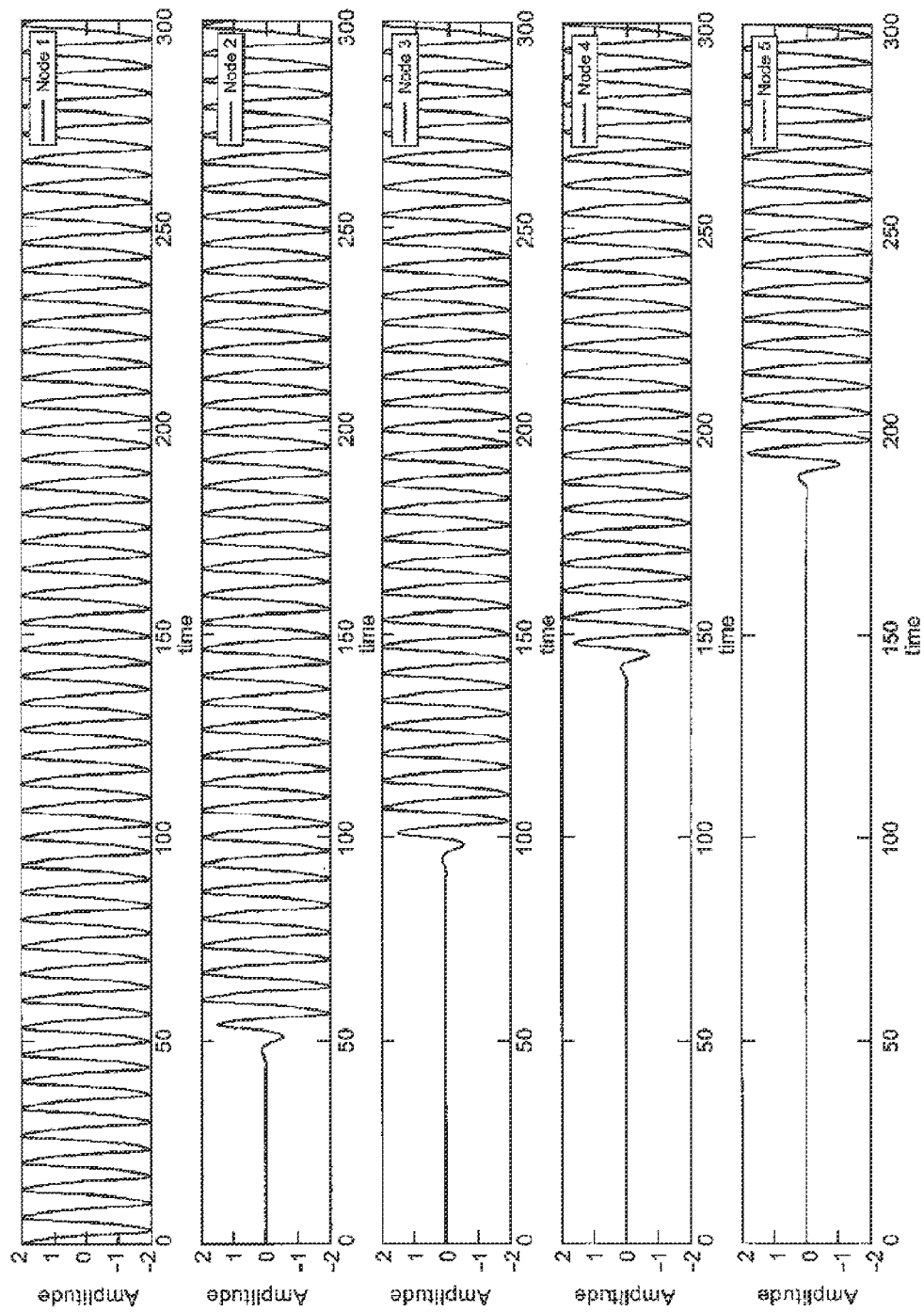
FIG. 2 is a graph showing, in a network including five nodes, Node 1, Node 2, . . . , Node 5, which are connected in series, a process in which phases of oscillation that has occurred in Node 1 are transmitted to other nodes.

FIG. 2 shows how phases of the oscillation that has occurred in Node 1 are transmitted among the five nodes: Node 1, Node 2, . . . , Node 5 connected in series. At time 0, Nodes 2 to 5 do not oscillate. It can be seen that the oscillation of Node 1 as the start node is sequentially transmitted to Node 2, Node 3, . . . .

FIG. 2 shows the example in which the nodes other than the start node do not oscillate at first, but in a case of the nonlinear oscillator, a phenomenon called entrainment in which the oscillation having high frequency converges to the oscillation having low frequency exists. Therefore, when the start node is caused to oscillate at the highest frequency and the other nodes are caused to oscillate at frequencies lower than that of the start node, and when the phase of the start node arrives, frequencies of the other nodes sequentially converge to the high frequency of the start node. This transmission of the frequency can be used in detecting the phase transmission. In a linear oscillator, this convenient entrainment phenomenon does not occur and hence the number of variations in detecting the phase transmission is reduced, but a linear oscillator may be used without any problem for simple transmission of the oscillation (case as shown in FIG. 2).

For simple description, a one-dimensional linear network has been used for description with reference to FIG. 1, which makes it difficult to imagine whether the network path selection can be performed with the above-mentioned phenomenon, but when the above-mentioned phenomenon is utilized, the network path selection can be performed.

Even when a plurality of links are connected to one node, the phase is transmitted via a path through which the phase is transmitted first, that is, the shortest path. Therefore, when focusing on a node, it can be considered that the link that has transmitted the phase to the node first forms the shortest path to the node. When m (m is a natural number) links are connected to a node, the links that have transmitted the phase to the node first, second, . . . , m-th are hereinafter called the first link, the second link, . . . an m-th link, respectively in the stated order. When the phase is transmitted via a link connected to the node and the first link is determined, the second and subsequent links of the node are disqualified for forming the shortest path. Therefore, when only the shortest path search is performed, only the first link may be recorded and the other links may be ignored.

In order to determine the shortest path from the start node to the node, a path that sequentially passes through the first links of the intermediate nodes from the first link of the node to return to the start node is determined. Similarly, a path that returns to the start node from each of the nodes other than the start node in the network is determined. In this way, with the start node as a vertex, the shortest paths to the other nodes are expressed in a tree form. This can be used to determine to which link the own node is to transmit information in order to transmit the information a desired target node.

Figure 3:
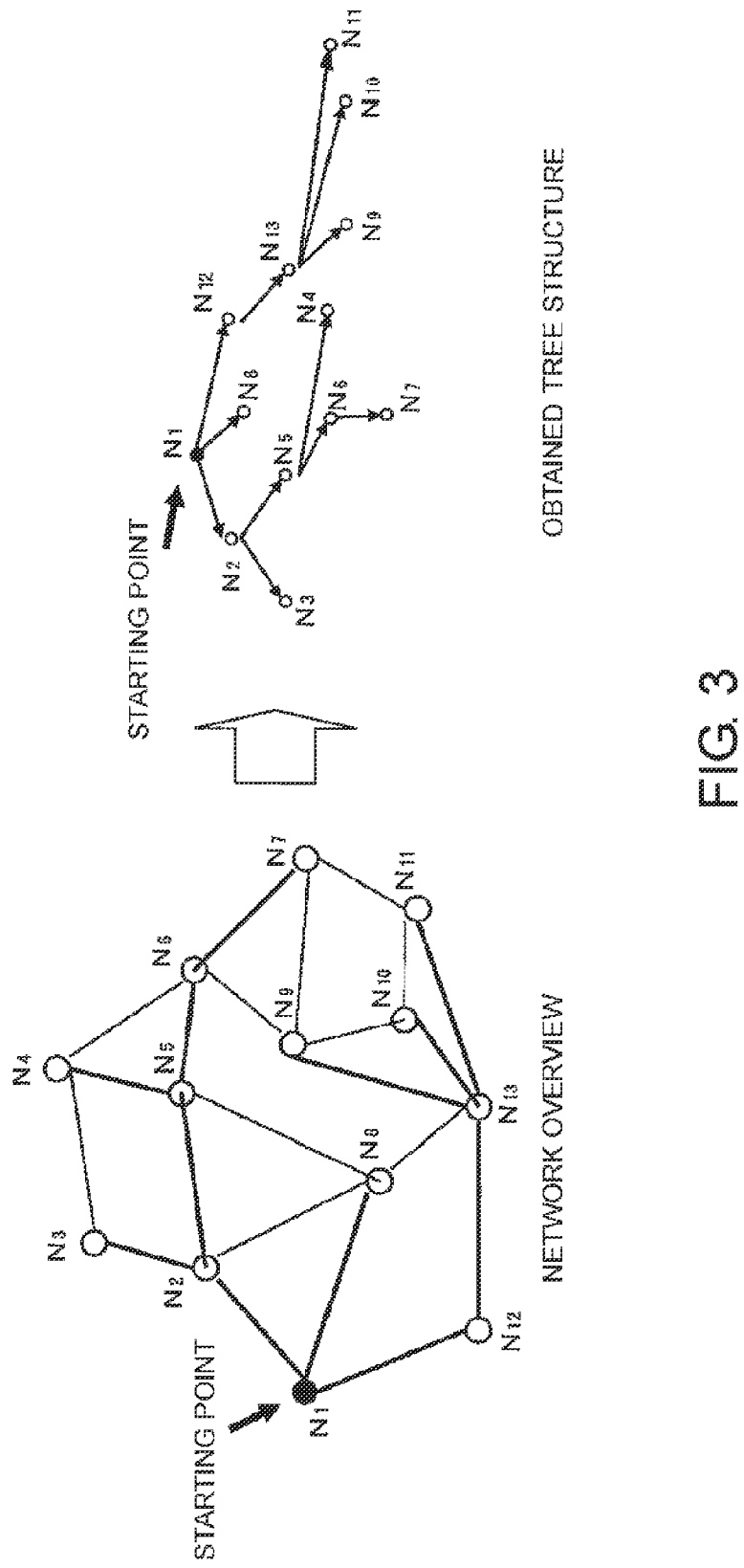
FIG. 3 illustrates an example of a network overview on the left side of the arrow, and a tree structure obtained based on the network overview and the first link of each node on the right side of the arrow.

The network overview on the left side of FIG. 3 illustrates an example in which the first links of the nodes are indicated by thick lines and the second and subsequent links are indicated by thin lines. When only the first links are extracted from the network overview, a tree structure on the right side of FIG. 3 can be obtained. For example, the shortest path from Node N1 as the starting point or the start node of the network overview on the left side of the figure to Node N7 can be seen from a tree structure on the right side of the figure as Nodes N1, N2, N5, N6, and N7.

When not only the shortest path but also the links to the second and third nodes are to be found, not only the link that has transmitted the phase to a node first but also a time at which the phase is transmitted is recorded for each link so that the transmission times of the links are compared to determine the places of the links.

Figure 4:
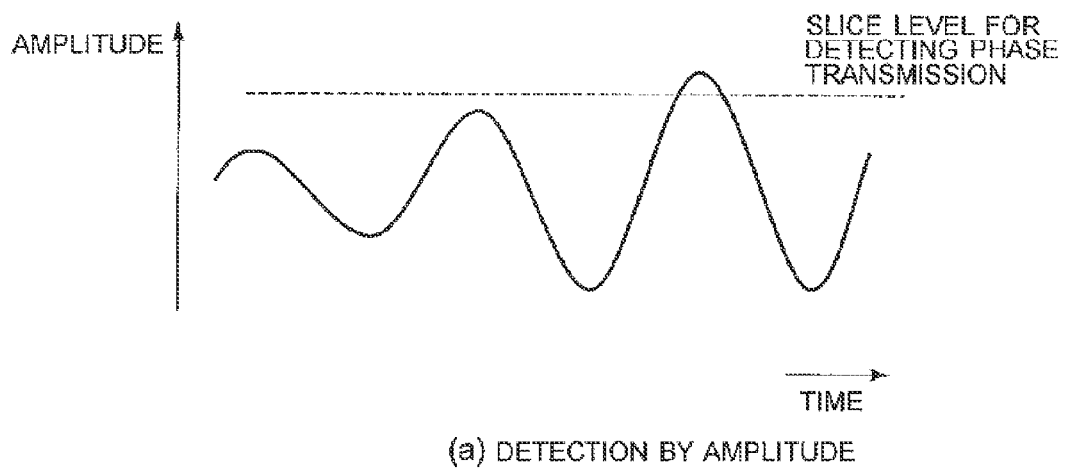
FIG. 4 includes graphs showing methods of detecting that a phase has transmitted to a node, of which (a) is a graph showing the method of detecting based on an amplitude of the node, and (b) is a graph showing the method of detecting based on a period of the node.
Figure 4:
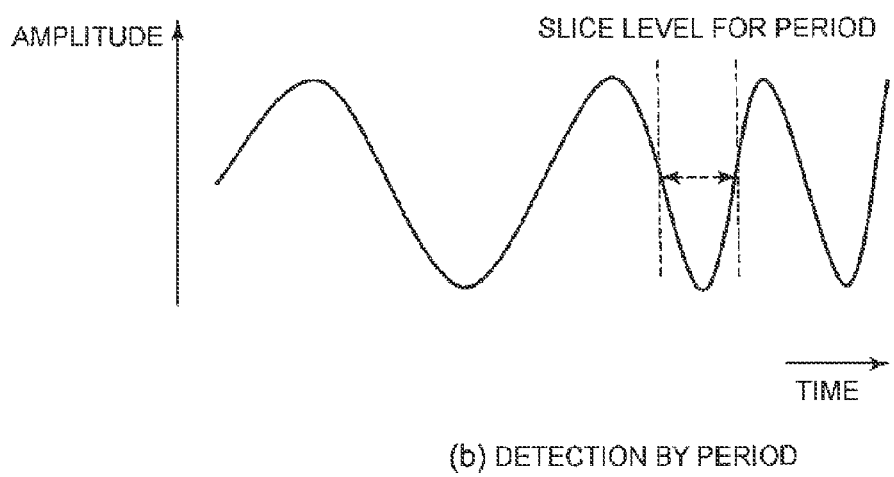

Several methods are contemplated to detect that the phase has been transmitted to the node, and two typical methods are shown together in FIG. 4.

The first method is to detect an amplitude change in the simulation of the oscillator corresponding to the node. When the phase is transmitted from an oscillator, oscillators that have not oscillated starts oscillation. The method uses this fact and when a certain amplitude is detected in the oscillator corresponding to the node, it is determined that the phase has been transmitted to the oscillator, that is, the node. As shown in FIG. 4(*a*), a slice level for detecting phase transmission is set, and a motion of the oscillator corresponding to the node is simulated, for example, in accordance with an equation such as Equation 1. At a time when the amplitude of the simulated oscillator has exceeded the slice level for detecting phase transmission, it is determined that the phase has been transmitted to the node.

The second method is to detect a period of the oscillation. Oscillators to which the oscillation has been transmitted from an oscillator that oscillates at a frequency come to oscillate with the same period as that of the oscillator as the transmission source. This fact is used to monitor the period of the oscillator simulated in accordance with the equation such as Equation 1, and when the same slice level for the period corresponding to the period of the oscillator of the start node has been reached, it is determined that the phase has been transmitted from the oscillator of the start node to the oscillator of the node.

The methods of detecting the phase have been described above, but when some links are coupled to one node, there may be a time when it is a little troublesome to determine from which link the phase has arrived. This is because, when the difference in phase transmission from the links is slight and the phase is actually transmitted from a plurality of links before being detected by the above-mentioned methods, in order to confirm from which node the phase has been transmitted first, an algorithm for analyzing the state of the oscillation in the link, the state of the oscillation of the previous node, and the like needs to be used.

Figure 5:
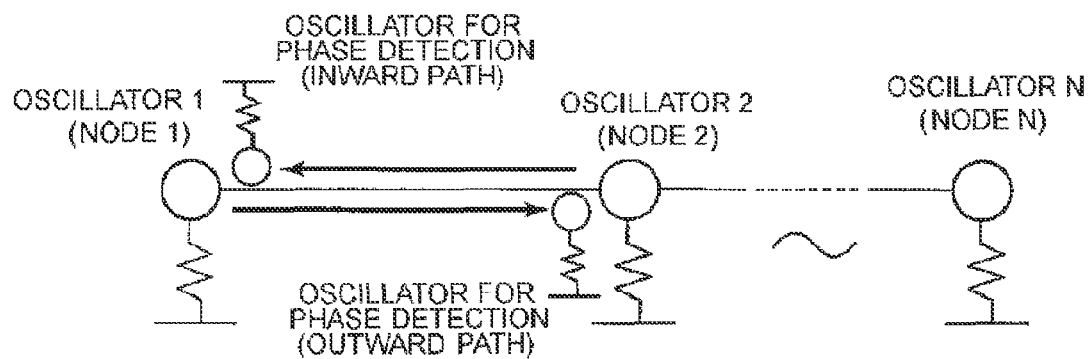
FIG. 5 is a modification of the path selection method of the first embodiment, and is a diagram illustrating the path selection method in which virtual oscillators for phase detection for identifying a node that has transmitted the oscillation to a link are provided.

Therefore, the inventors of the subject application have also devised an improved path selection method as illustrated in FIG. 5. For simple description, as with FIG. 1, a one-dimensional linear network is used for description. FIG. 5 is different from FIG. 1 in that oscillators for phase detection for detecting from which node the phase has been transmitted are virtually provided to each link. As described above, the oscillators corresponding to the nodes are simulated as moving in accordance with an equation capable of describing the diffusion of the oscillation, such as Equation 1, and motions of the oscillators for phase detection are also simulated in accordance with the same equation. The same applies to the diffusion coefficient D.

For convenience, the two oscillators are called an outward path and an inward path, respectively. In this embodiment, each of those oscillators for phase detection is also formed by the Van der Pol oscillator. Two oscillators for phase detection are provided to each link for the outward path and the inward path, and each oscillator transmits only the oscillation of the node located on the opposite side of the oscillator, and at a time when the oscillation is transmitted to the oscillator itself, determines that the oscillation has been transmitted from the node located on the opposite side of the oscillator. In this manner, the transmissions of the oscillation on the outward path side and the inward path side are clearly distinguished, and it can be determined from which side the phase has been transmitted first.

Referring to FIG. 5, two nodes are provided adjacent to each other in the network, and Oscillator 1 and Oscillator 2 are provided as oscillators corresponding to the nodes. Oscillator 1 and Oscillator 2 are connected via a link. Near an end portion on the Oscillator 1 side of the link, an oscillator for phase detection (inward path) is virtually provided as a virtual oscillator that does not correspond to the nodes in the network. In the same manner, an oscillator for phase detection (outward path) is virtually provided near an end portion on the Oscillator 2 side of the link. The oscillator for phase detection (inward path) is caused to transmit only the oscillation from Oscillator 2 and not to transmit the oscillation from Oscillator 1. In the same manner, the oscillator for phase detection (outward path) is caused to transmit only the oscillation from Oscillator 1 and not to transmit the oscillation from Oscillator 2.

Figure 6:
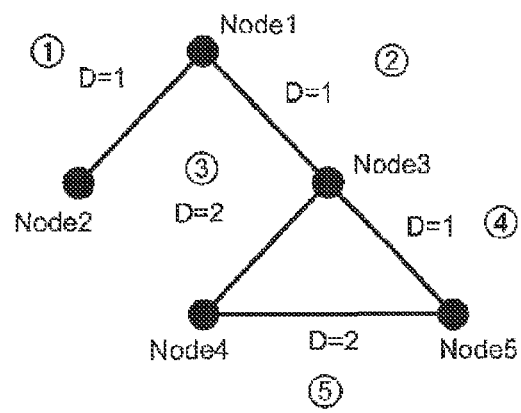
FIG. 6 is a diagram illustrating detection of an oscillation shift in an outward path and an inward path of a link by an oscillator for phase detection provided in the network including five nodes.

Now, a network in which five nodes: Node 1, Node 2, . . . , Node 5 are connected as illustrated in FIG. 6 is considered.

Figure 7:
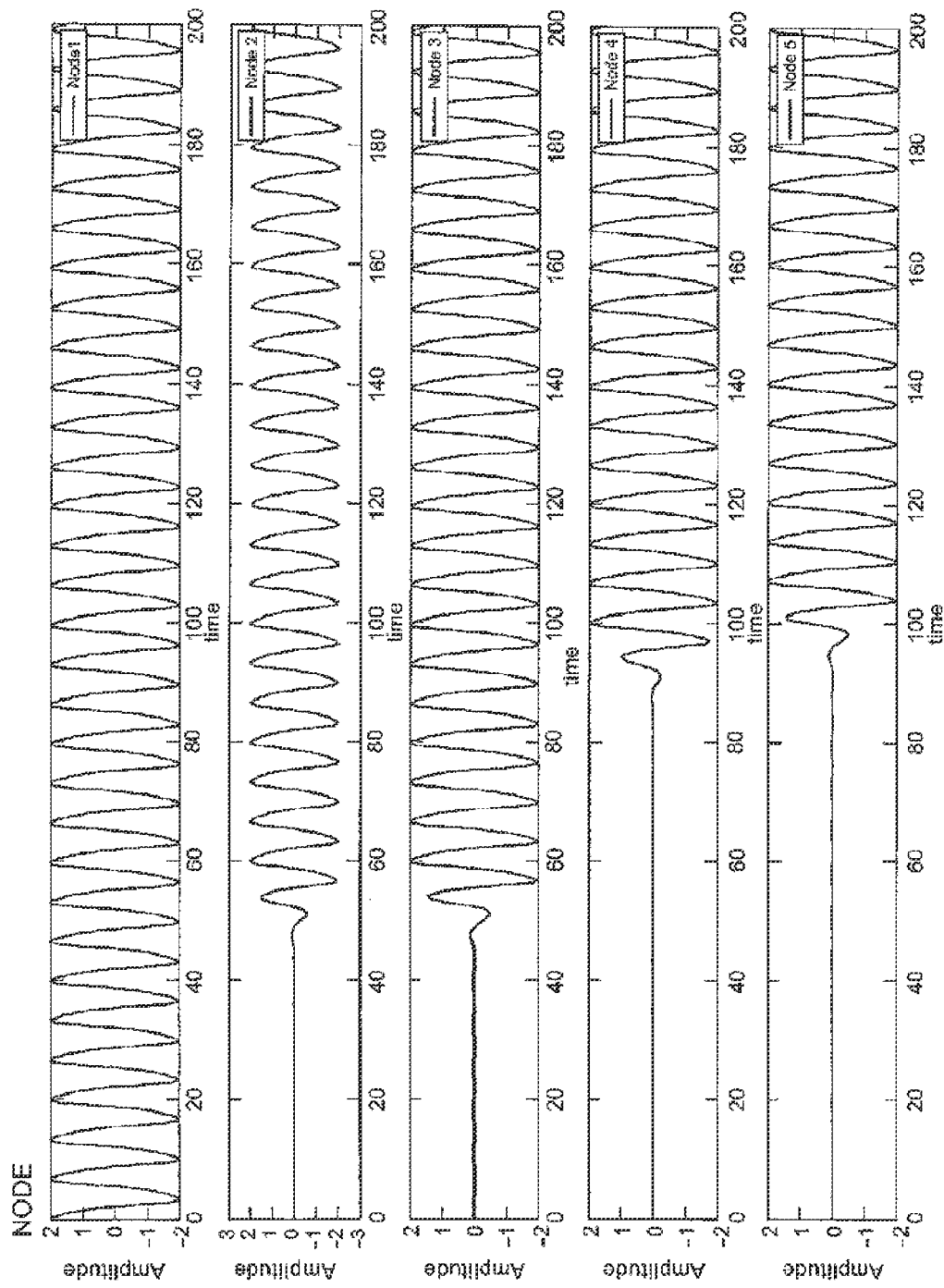
FIG. 7 is a graph showing oscillations of Node 1, Node 2, . . . , Node 5 of FIG. 6.
Figure 8:
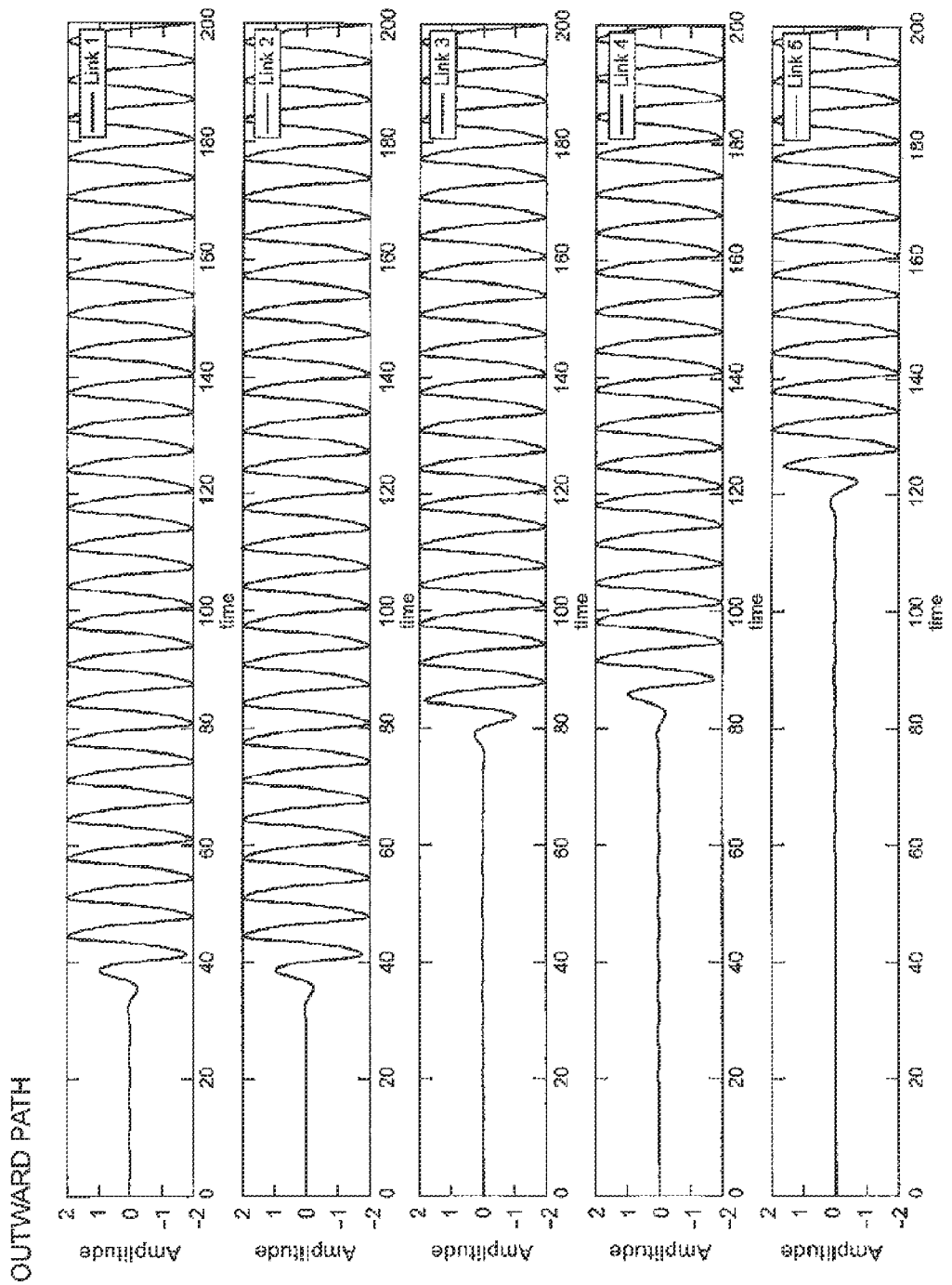
FIG. 8 is a graph showing oscillations of the oscillators for phase detection for the outward path of Link 1, Link 2, . . . , Link 5 of FIG. 6.
Figure 9:
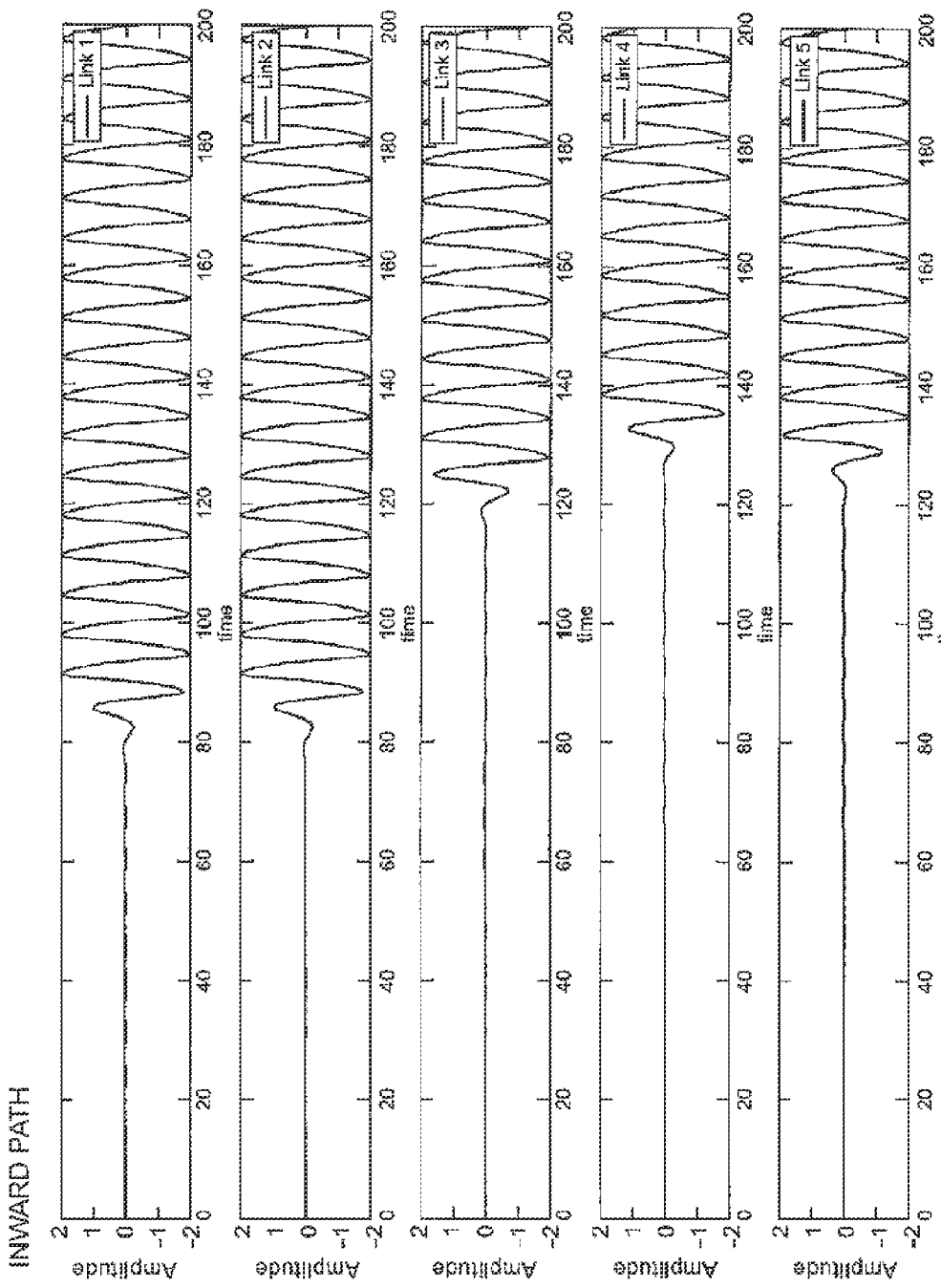
FIG. 9 is a graph showing oscillations of the oscillator for phase detection for the inward path of Link 1, Link 2, . . . , Link 5 of FIG. 6.

The numerals in circles in the figure are link numbers indicating the corresponding links, and for example, the link between Node 1 and Node 2 has a link number of 1. FIG. 6 illustrate Link 1, Link 2, . . . , Link 5. The value of D written on the side of each of the link numbers is a value indicating the connectibility of the nodes in the link, and corresponds to the diffusion coefficient D in Equation 1 above. Each of Links 1, 2, . . . , 5 is provided with the oscillators for phase detection (not shown) for the outward path and the inward path. At this time, results obtained by simulating oscillations of the oscillators corresponding to Node 1 to 5, the oscillators for phase detection (outward path) in Links 1 to 5, and the oscillators for phase detection (inward path) in Links 1 to 5 are shown in FIGS. 7 to 9. In particular, it can be seen from the comparison of FIGS. 8 and 9 that the oscillations of the outward path and the inward path are slightly shifted, which allows to determine which path is the shortest path clearly.

This embodiment allows easy parallelization of the computation, and hence is compatible with hardware that is good at parallel computation, such as GPGPU. Further, in contrast to a second embodiment described below, the distance between the nodes may be treated as a continuous value.

Second Embodiment

Next, a path selection method according to the second embodiment of this invention is described. In the first embodiment, the nodes are likened to oscillators and the links are likened to transmission media of the oscillation so that the motions of the nodes when the physical phases are transmitted between the nodes are simulated on the computer. In contrast, in this embodiment, there is constructed such computational model that every link in the network is divided to the number of sections, the number being determined depending on the physical quantities (for example, distance, transmission speed, and the like of the link) regarding the link, and one of the divided section and a unit of time are correlated to simulate a propagation state of a signal in the network, that is, the process in which the signal transmitted by the start node is propagated to the other nodes. A unit of quantity of the physical quantities indicating the coupled state of the network (or link) is set in association with the unit of time, and then the physical quantities of the link are changed discretely every unit of time to construct such a model as to simulate the propagation state of the signal in the link. For example, when the distance of the link is used as the physical quantity indicating the coupled state of the network, the point to which the signal is transmitted between one end to the other end of the link, which is expressed by the moving distance of the signal in the unit of time, that is, an integer multiple of a unit of distance, is the transmission state of the signal in the link. A case where the distance of the link is used as the physical quantity of the link is considered here. The signal transmitted from the start node moves in the link, and the movement of the signal in the link until reaching each of the other nodes is virtually simulated. It is assumed that the signal is transmitted in the link at a constant speed, and that when the signal is input from a link to the node, the signal is branched to be output from all the links including the link at the time of the input. Moreover, it is assumed here that all the links in the network have a uniform transmission speed.

As in the first embodiment, prior to the path selection, each of the nodes acquires the overall image information of the network, that is, the topology information and the coupled state information of the network from the network. The distance between the nodes, that is, the distance of the link is described here to be acquired as the coupled state information.

The distance by which the signal is transmitted in the link in the unit of time is called the unit of distance. The unit of distance is at most a distance of the shortest link in the network, and is set depending on the required accuracy. When a smaller unit of distance is used, the computation accuracy becomes higher but the computational load becomes larger. When all distance ratios between the links in the network can be expressed by integers, the greatest common divisor of the integers may be used as the unit of distance to achieve both the high computation accuracy and low computational load.

Obviously, it takes 2 units of time for the signal to pass through the link having 2 units of distance, and 3 units of time to pass through 3 units of distance. In this manner, when all the links in the network are approximated by integer multiples of the unit of distance, the signal passes through any link in the network in an integer multiple of the unit of time, and the units of time that have elapsed since the signal has entered the link directly indicates the current position of the signal in the link.

Therefore, a counter which is activated and starts counting immediately when the signal enters the node at one end of the link, increments the count by one every time the unit of time is elapsed, and counts up to the value equal to an integer value approximating the distance of the corresponding link by an integer multiple of the unit of distance is provided so as to correspond to each link in the network. In such counter, the value of the counter reaching the upper limit means that the signal that has entered from the node at one end of the corresponding link arrives at the node at the other end of the link. Such counter is provided for each node in the network, and the values of all the counters that are currently active in the network are incremented by 1 every unit of time, to thereby simulate the process in which the signal transmitted from the start node is transmitted to the other nodes in the network.

In order to obtain a reasonable result in the first embodiment, one period is divided into units of time on the order of about several thousands, and each time the unit of time has elapsed, arithmetic processing of solving the equation such as Equation 1 for the time is generated. When the process in which the oscillation is transmitted from one end to the other end of a link is simulated, if the oscillation lasts for 100 periods, during which about several hundred thousand units of time elapse, and hence the above-mentioned arithmetic processing is executed about several hundred thousand times. Further, the arithmetic processing is arithmetic processing including scientific computing such as differential computation, and is a floating-point operation. Therefore, when the entire computational loads necessary for the simulation are compared, the first embodiment is not so advantageous as compared to approaches based on the Dijkstra method. However, the approach of the first embodiment allows easy parallelization, and hence when the parallel computation is performed, the processing may be executed in a shorter time than the approaches based on the Dijkstra method. Note that, in general, the approaches based on the Dijkstra method are difficult to parallelize.

As compared to the first embodiment described above, in the second embodiment, the unit of time may be elongated to reduce the required computational load. For example, in this embodiment, though depending on the required computation accuracy and the variation between the distances of the links in the network, the distance of the shortest link in the network may be set as the unit of distance, and in this case, one unit of time elapses in the simulation of signal passage through the shortest link. Further, the processing to be executed each time the unit of time elapses in the second embodiment is essentially processing of determining whether the counter is active for each link and adding 1 to the value of the active counters. This processing imposes less load as compared to the arithmetic processing of the scientific computing such as the differential computation. In other words, in the second embodiment, the number of arithmetic processing to be executed is small, and the load of the arithmetic processing to be executed each time is light.

In the first embodiment, in order to identify the link that has transmitted the oscillation to the node, the oscillators for phase detection as in FIG. 5 are provided. In order to identify the transmission direction of the signal, in this embodiment, two counters, that is, a counter for the outward path and a counter for the inward path may be provided for each link. In general, the nodes are connected to both ends of one link, respectively. The counter for the outward path sets one node as an associated node, and the counter for the inward path sets the other node as an associated node. When the associated node of the counter for the outward path detects the transmission of the signal, the counter for the outward path starts counting in response thereto. The counter for the inward path starts counting in the same manner.

Next, the simulation processing performed in this embodiment is described. In this processing, the process in which the signal transmitted from the start node moves through the link in the network is simulated.

At the same time the start node transmits the signal, a counter having the start node as the associated node is activated. When a plurality of links are connected to the start node, all the plurality of counters corresponding to the links are activated. The time at which the signal is transmitted from the start node is hereinafter denoted as t=0, and times after 1, 2, . . . , n units of time have elapsed are denoted as t=1, 2, . . . n, respectively.

Each time one unit of time is elapsed, the values of all the active counters are incremented by 1. At t=1, the values of all the counters having the start node as the associated node are 1, which indicates that the signal is traveling the position away from the start node by one unit of distance in the links connected to the start node.

When one of the links connected to the start node has 2 units of distance, the counter of the link finishes counting at t=2. The fact that the counter has finished counting means that the signal transmitted or input from one of the two nodes connected to the link has arrived at the other node. At the same time the signal arrives at the node, the link, the node, and the time are recorded in association with one another, and a counter having the node as the associated node is activated. As with the activation of the counter at the start node, when there are a plurality of counters having the node as the associated node, all the counters are activated.

Thereafter, every time one unit of time is elapsed, the counter that has been activated as described above is caused to count up by 1 along with the already-active counters. When any one of the active counters finishes counting and the signal arrives at the node, an operation of activating all counters having the node as the associated node is repeated. When there is no counter having as the associated node the node at which the signal arrives when the counting is finished, no new counter is activated.

As a result of the simulation described above, for each of the nodes in the network, the node, the link which has transmitted the signal to the node, and the arrival time are recorded in association with one another. When only the shortest path is to be determined, the second embodiment is similar to the first embodiment in that only the first link of each node needs to be recorded, and in this case, based on the known network topology and the first link of each link, a tree structure similar to that of FIG. 3 may be generated.

In this embodiment, the computation step (time) and the distance of the link are correlated as the unit of time and the unit of distance. Therefore, this embodiment is not good at expressing the distances of the links continuously and needs to approximate the distances as somewhat discrete values. However, the physical phase is not computed, and hence even with the current CPU that is good at serial processing, the computation time may be reduced significantly. This is a great merit of this embodiment. As with the first embodiment, the computation is easily parallelized, and hence it is further preferred to use a GPGPU for computation.

In the above description, every link in the network has a uniform transmission speed, but this embodiment may be used even when links having different transmission speeds are mixed. For example, considering Link L1 having the distance of 2 and the transmission speed of 1 and Link L2 having the distance of 4 and the transmission speed of 2, even though the distance of Link L2 is twice that of Link L1, the transmission speed of Link L2 is also twice that of Link L1, and hence it is considered that the periods of time required for the signal to pass through Link L1 and Link L2 are the same. In consideration of this, when the distance of each link multiplied by a factor that is proportional to the reciprocal of the transmission speed of the link is called a real distance, the real distance of each link may be determined before setting the unit of distance so that the unit of distance is set based on the real distance. The thus-determined unit of distance is called a real unit of distance. A value obtained by approximating the real distance of the link by an integer multiple of the real unit of distance is set as an upper limit value of the counter of the link. In this manner, this embodiment may be applied also to the network in which links having different transmission speeds are mixed.

In the above description, the counter adds 1 to the count value every unit of time, but the counter may subtract instead. Specifically, to each link in the network, a counter value that is proportional to the distance of the link is set in advance, and the counter is activated in response to the signal reaching a node at one end of the link. The activated counter subtracts the count value by 1 each time one unit of time is elapsed. When the count value becomes zero, it is considered that the signal has reached a node at the other end of the link.

Further, the counter is used this time to transmit virtual phase transmission information, but as long as "information that the phase has been transmitted" to be used can be correlated with the physical transmission of the phase, similar effects as those of the invention of the subject application can be obtained.

Example 1

Figure 10:
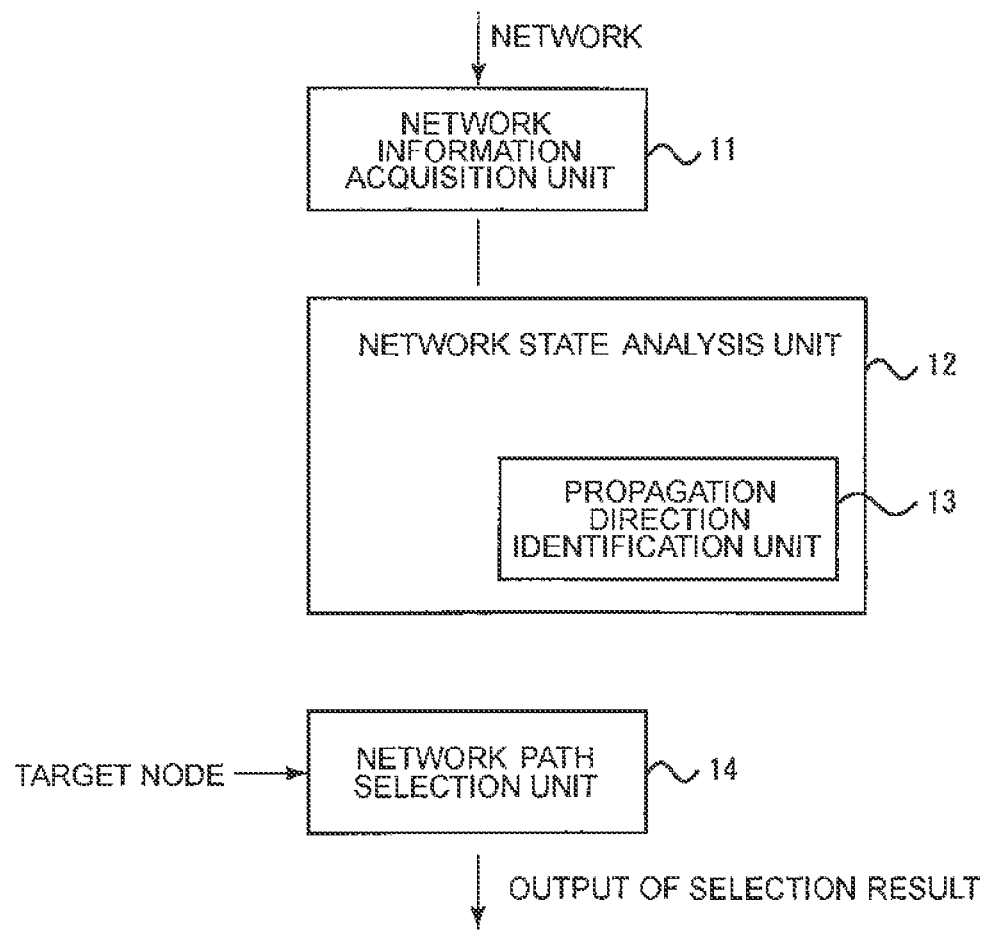
FIG. 10 is a block diagram illustrating a path selection device of Examples 1 and 2.

Next, a path selection device 10 according to Example 1 of this invention is described with reference to FIG. 10. The path selection device 10 includes a network information acquisition unit 11, a network state analysis unit 12, a propagation direction identification unit 13, and a network path selection unit 14. The path selection device 10 and the units 11 to 14 are realized as a computer that operates in accordance with a program stored in a storage device, and more specifically constitutes, for example, a part of a server of an internet access provider or a router.

The network information acquisition unit 11 includes a network interface device, and acquires the overall image information of the network, specifically, the topology information of the network and the coupled state information of the network from the network.

The most prominent feature of the invention of the subject application is the network state analysis unit 12. The network state analysis unit 12 may include the propagation direction identification unit 13, and in this example, a case where the propagation direction identification unit 13 is mounted therein is illustrated.

The role of the network state analysis unit 12 is to process the information on the coupled state of the network acquired by the network information acquisition unit 11 into information with which the network path selection unit 14 may perform the path selection. The processing performed by the network state analysis unit 12 is the device that executes the path selection processing by the path selection method described in the first embodiment. In other words, in the network including as the nodes the oscillators which move in accordance with the equation capable of describing the diffusion of the oscillation and are connected via links that transmit the oscillation depending on the physical quantity indicating the connectibility of the nodes, the following processing is executed: the process in which the oscillation in the oscillator corresponding to the start node is transmitted to the other oscillators is simulated to determine the first link of each of the nodes; and a tree structure (for example, as the one on the right side of FIG. 3) is determined from the network topology (for example, as the network overview on the right side of FIG. 3) prepared in advance and the first link of each of the nodes. The start node is a server, a router, or the like including the path selection device 10. In this example, the phase transmission by the nonlinear oscillators is used. A Van der Pol oscillator is used as the nonlinear oscillator.

As described above with reference to FIGS. 5 and 6, the propagation direction identification unit 13 is a part for monitoring the statuses of the virtual links for the outward path and the inward path provided to each link. The network state analysis unit 12 uses monitoring information of the virtual links obtained by the propagation direction identification unit 13 to generate the tree structure as illustrated in FIG. 3. In this example, the example of performing the shortest path search is illustrated, but as described in the Effect of the Invention section, the invention of the subject application may be applied to a selection of various paths by storing the phase transmission times from the links.

The network path selection unit 14 selects and outputs, based on the tree structure determined by the network state analysis unit 12, the shortest path from the node device serving as the start node, such as the server, the router, or the like including the path selection device 10 to the node device serving as the target node, which is specified by an external program or an input device.

Figure 11:
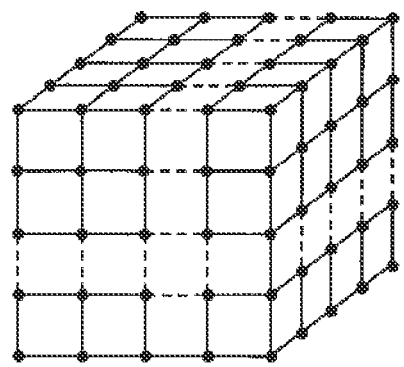
FIG. 11 is a diagram illustrating a network for which a shortest path search has been performed by using the path selection device of Examples 1 and 2.

FIG. 11 illustrates an example of the network for which the shortest path search is performed in this example. A cubic network is constructed and used with the number of nodes being N. Further, in this example, the distances (diffusion coefficients D) of all the links are the same.

This example is an example in which physical phases of a plurality of nonlinear oscillators are computed, and hence the computation is slow with a single normal CPU. Therefore, in this example, a GPGPU was used to perform parallel computation. The general purpose graphic processing unit (GPGPU) is a graphics processor that can be used for general purpose, and is a processor which is capable of realizing super parallel computation with an inexpensive board and is attracting attention in recent years. The GPGPU is attracting attention because the computational performance of a single CPU has already peaked, and there is no other way to increase the total computation performance than to perform simple processing in a super parallel fashion. As in the embodiment of the subject application, an algorithm suitable for parallel computation in which each process (computation by each nonlinear oscillator) may be performed independently is expected to be a mainstream in the future with the aid of the GPGPU or the like. The algorithms such as the Dijkstra method that have conventionally been used are not suitable for parallel computation.

When this example was performed with the above-mentioned conditions to perform the shortest path search from an arbitrary start node to all the other nodes, a reasonable output of the tree structure was obtained.

Figure 12:
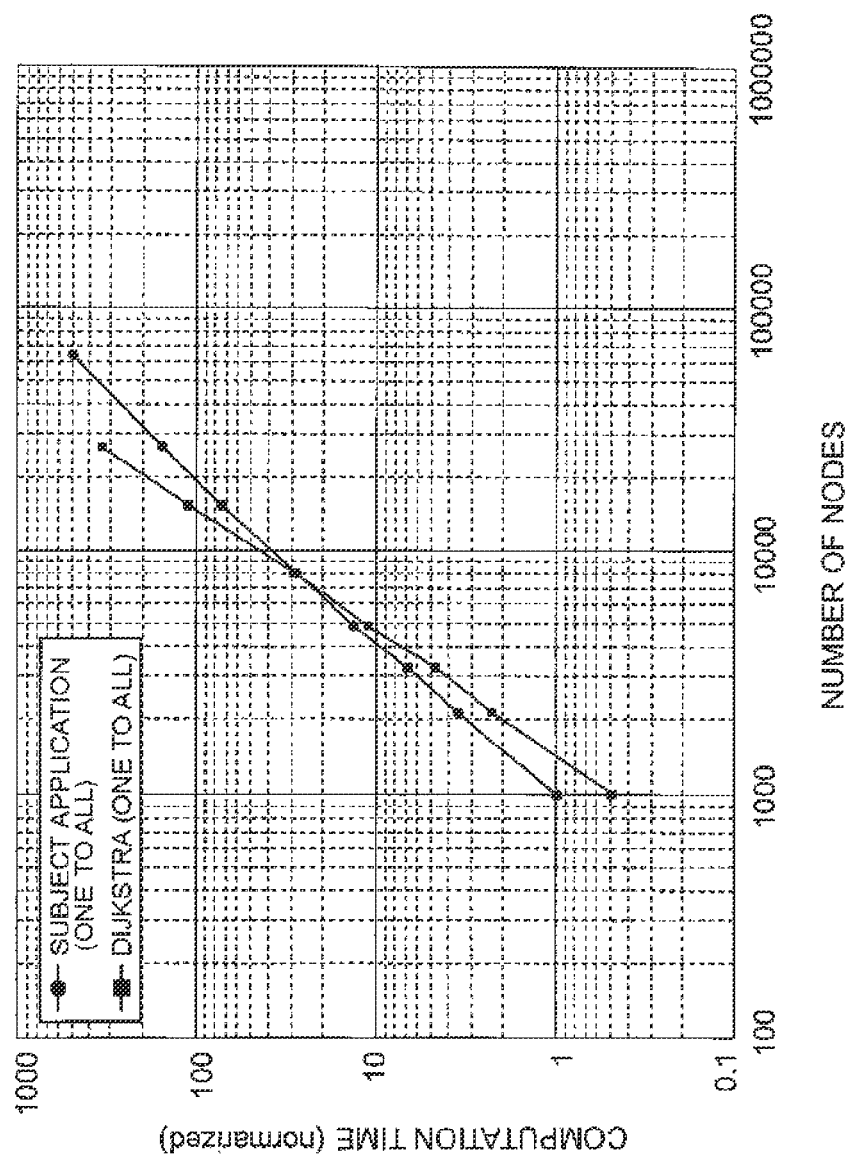
FIG. 12 is a graph showing a relationship of computation time and the number of nodes of the shortest path searches performed for the network of FIG. 11 with the conventional path selection device using the Dijkstra method and the path selection device of Example 1.

FIG. 12 shows the results of the computation speeds of the Dijkstra method and this example dependent on the number of nodes. The computation speed is calculated as being normalized with the computation time of this example at 1,000 nodes. In this example, faster computation result than that of the conventional Dijkstra method is obtained as the number of nodes becomes larger. This shows that the invention of the subject application is a very effective path selection method.

Example 2

A path selection device according to Example 2 of this invention is described. This example corresponds to the second embodiment. The path selection device in this example also has a similar configuration as that of the path selection device of Example 1, and hence is described with reference to FIG. 10.

In this example, the network state analysis unit 12 does not compute the phase transmission by the nonlinear oscillators but performs simulation corresponding to the second embodiment. Specifically, with the time when the signal is transmitted from the start node as a starting point, the position of the signal on the link for each unit of time is computed to determine the first link and the like of each node.

In the first embodiment, the computation necessary for the simulation is easily parallelized and hence the simulation is executed with the GPGPU in Example 1, but in the second embodiment, not only the parallelization of the computation is easy but also the computational load required for the simulation is low, and hence the computation speed is increased even with a CPU that is not parallelized. In order to clarify this effect, a result obtained by using a general CPU is shown in the graph. Note that, the second embodiment is also easy to parallelize, and when the computation processing is parallelized and implemented by a GPGPU, a further increase in speed may be realized.

The used network is the same cubic network as illustrated in FIG. 11 similarly to Example 1. Further, the conditions are that the distances of all the links are the same and that information reaches the adjacent node after one time. When this example was performed with the above-mentioned conditions to perform the shortest path search from an arbitrary start node to all the other nodes, a reasonable output of the tree structure was obtained.

Figure 13:
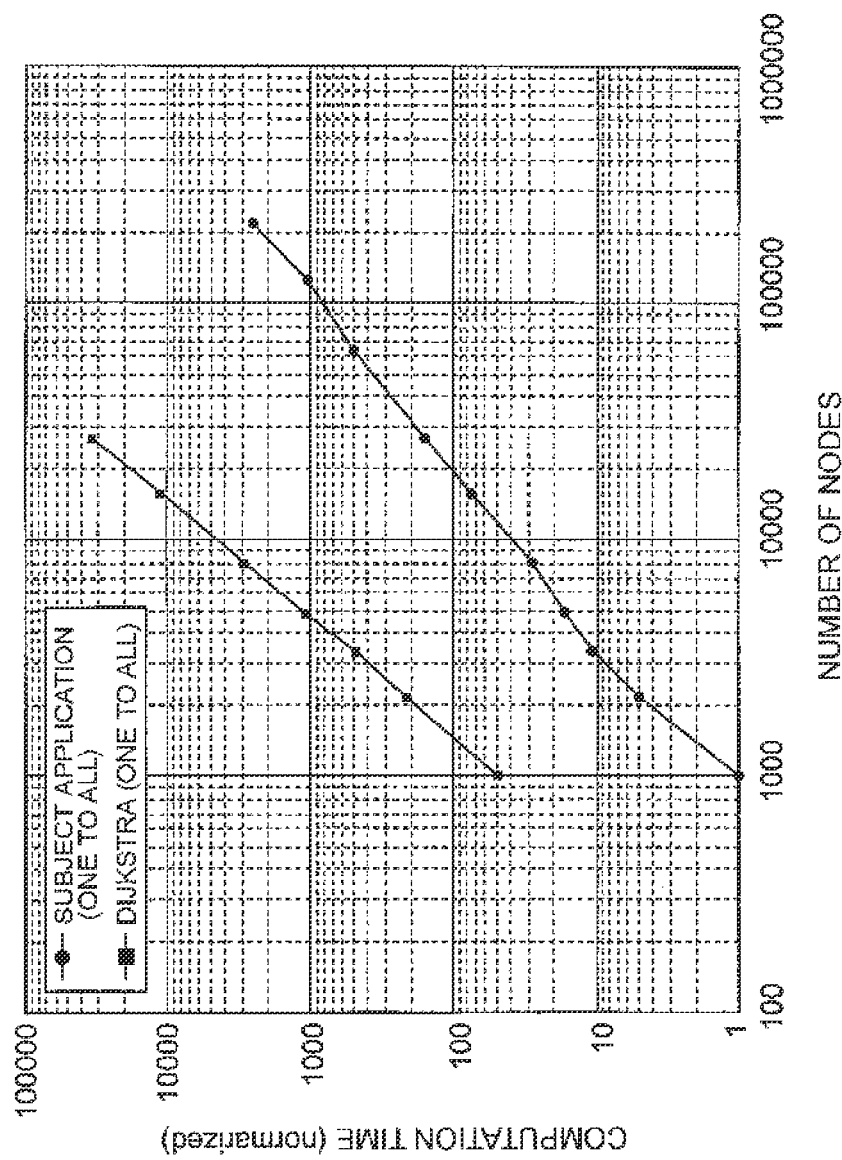
FIG. 13 is a graph illustrating a relationship between computation time and the number of nodes of the shortest path searches performed for the network of FIG. 11 with the conventional path selection device using the Dijkstra method and the path selection device of Example 2.

FIG. 13 shows the results of the computation speeds of the Dijkstra method and this example dependent on the number of nodes. The computation speed is calculated as being normalized with the computation time of this example at 1,000 nodes. In this example, faster computation result than that of the conventional Dijkstra method is obtained.

It has been described in the description of the first and second embodiments that the method of this invention operates on the precondition that the overall image of the network is known correctly to some extent. At that time, it has been expected that a question as to whether the overall image of the network needs to be grasped correctly would arise. In order to answer such question, a simple simulation as described below was performed. This is described with reference to FIG. 14.

In this simulation, when the information is transmitted from the start node to the target node, the path selection device 10 in this example is used to select the shortest path to the target node, and the information is transmitted along the shortest path. In the overall image information of the network used when the path selection device 10 determines the shortest path, a node in which a fault occurs does not exist in the network. The links constituting the shortest path determined at this time are illustrated by thick lines in the figure.

Figure 14:
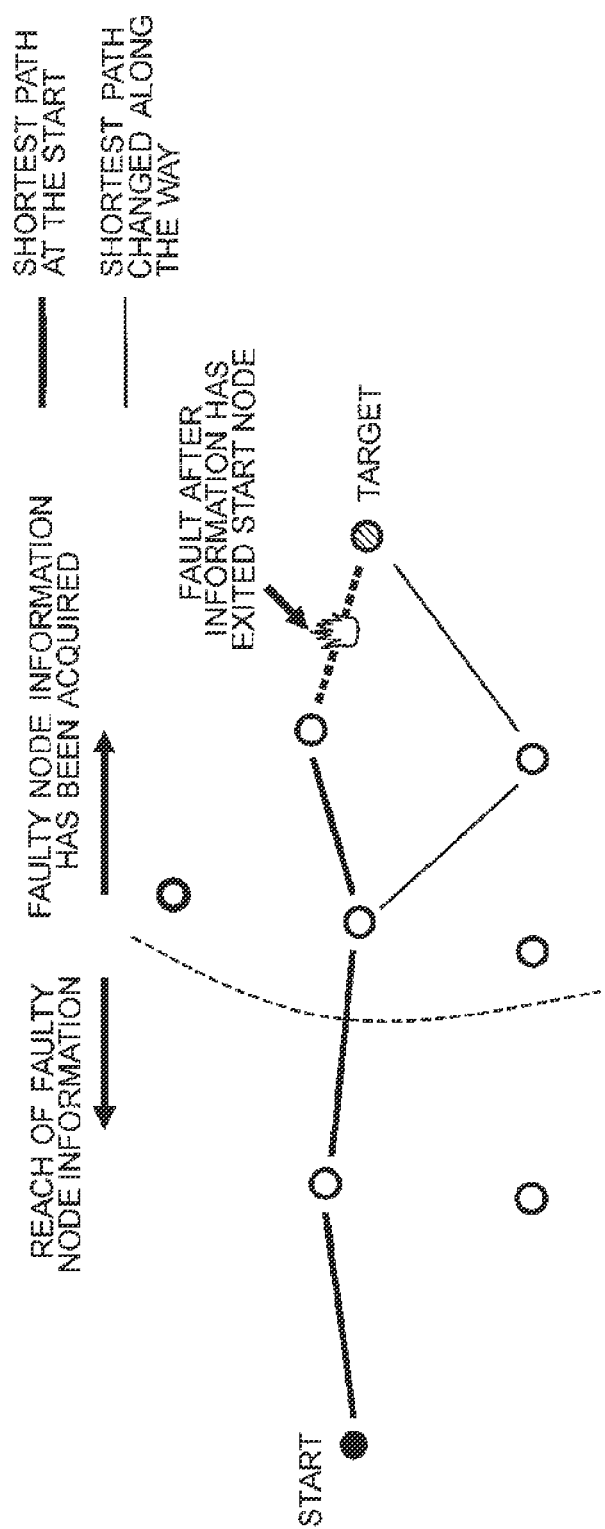
FIG. 14 is a diagram illustrating, when a failure occurs in a node on an already-determined shortest path in a period in which information is transmitted from a start node and the information arrives at a target node, how a node that has acquired failure node information determines a new shortest path so that a network of this invention autonomously avoids the failure.

In a period from when the information is transmitted from the start node until the information arrives at the target node, it is assumed as illustrated in FIG. 14 that a fault has occurred in a node on the previously determined shortest path. At this time, a need to notify the nodes in the network of faulty node information arises. The faulty node information is finally transmitted to all the nodes, and the overall image information of the network in all the nodes is updated. However, immediately after the fault has occurred, the overall image information of the network may be updated only in the nodes surrounding the node in which the fault has occurred, and cannot be updated in distant nodes.

On the other hand, the nodes that have received the information transmitted by the start node transfer the information along the shortest path to the target node, the shortest path being determined based on the overall image information of the network that has been acquired by the node to that time point.

When the simulation was performed on the above-mentioned preconditions, it was confirmed that an intermediate node detected the failure that had not been known at the time when the start node had transmitted the information, and thereafter, the information is transmitted along the shortest path determined based on the updated overall image information of the network. In this manner, according to this invention, the network may autonomously avoid the failure and transmit the information to the target node.

Such effects may be obtained because, according to the path selection method of this invention, the path selection may be executed at very high speed, and hence the path selection computation that has not been executable at high frequency can be executed every time the nodes transmit information. Further, when the path selection processing based on the path selection method of this invention is performed as described above in each node of the network every time the node transmits information, a network that avoids a failure autonomously may be provided. As described above, the path selection method according to this invention is a very effective path selection method that is not limited to the simple high-speed operation.

This invention has been described above by way of the embodiments and the examples, but this invention is not limited thereto, and various modifications may be made without changing the technical meaning of this invention.

For example, the above-mentioned embodiments and examples have been described taking the information network as an example of the network, but this invention is not limited to the type of the network and may be applied, for example, to the path selection in the traffic network.

Further, in the above description, the case where the shortest path search is performed has been mainly described, but processing satisfying requests for a selection of various paths such as the second shortest path and the third shortest path is also possible.

Further, in the above description, the distance of the link has been used as the coupled state information of the network, and hence the selected path has been the shortest path, but the coupled state information of the network is not limited to the distance of the link. For example, a selection of a desired path may be performed with the speed, capacity, and the like of the information flow through the link being used as the coupled state information.

Further, in the first embodiment and Example 1, the nodes are likened to the nonlinear oscillators, but for example, the phase may be transmitted by using a soliton.

This application is based on and claims the benefit of priority from Japanese Patent Application No. 2010-259345, filed on Nov. 19, 2010, the entire disclosure of which is incorporated herein by reference.

The invention claimed is:

1. A path selection device, comprising:
network information acquisition means for acquiring, by a start node which is a source of an oscillation or a signal to be simulated regarding a transmission process in a network and is one node in the network, coupled state information of the network indicating a connectibility of nodes in the network from the network;
network state analysis means for determining, by an arithmetic unit of the start node executing the simulation in accordance with a computational model constructed based on the coupled state information, when n (n is a natural number) links connected to the one node in the network are called a first link, a second link, . . . , an n-th link in order from a link that has transmitted the oscillation or the signal first to the one node, at least the first link for each of the nodes in the network; and
network path selection means for selecting by the start node a path that extends from a target node, which is one node in the network other than the start node, to the start node via the first link of intermediate nodes as a desired path between the start node and the target node,
wherein the computational model comprises a computational model in which the nodes in the network are likened to oscillators that oscillate in accordance with an equation defined based on the coupled state information and transmit the oscillation to each other via a link between the nodes,
wherein the start node is formed into the computational model as an oscillator that moves as a source of the oscillation,
wherein a physical phase of each of the oscillators is simulated, to thereby simulate transmission of the oscillation from the oscillator of the start node to other oscillators, and
wherein in order to detect the transmission of the oscillation in one direction along a link, a motion of a virtual oscillator that does not correspond to the nodes is included in the simulation.

2. A path selection device, comprising:
network information acquisition means for acquiring, by a start node which is a source of an oscillation or a signal to be simulated regarding a transmission process in a network and is one node in the network, coupled state information of the network indicating a connectibility of nodes in the network from the network;
network state analysis means for determining, by an arithmetic unit of the start node executing the simulation in accordance with a computational model constructed based on the coupled state information, when n (n is a natural number) links connected to the one node in the network are called a first link, a second link, . . . , an n-th link in order from a link that has transmitted the oscillation or the signal first to the one node, at least the first link for each of the nodes in the network; and
network path selection means for selecting by the start node a path that extends from a target node, which is one node in the network other than the start node, to the start node via the first link of intermediate nodes as a desired path between the start node and the target node,
wherein the path selection device is a computational model in which every link in the network is divided into a number of sections, the number being determined based on a physical quantity regarding the link, and one of the number of sections and a unit of time are correlated to simulate a propagation state of the signal in the network.

3. A path selection device according to claim 2,
wherein the computational model approximates the physical quantity of each link as an integer multiple of a value indicating a unit physical quantity, which is the physical quantity regarding one link per unit of time, and models movement of the signal assuming that the physical quantity changes discretely in steps of the unit physical quantity every time the unit of time is elapsed, and
wherein a counter which starts counting from a time when the signal enters a corresponding link, increments a count by one every time the unit of time is elapsed, and counts up to a value corresponding to the physical quantity of the corresponding link is provided so as to correspond to each link of the network.

4. A path selection device according to claim 3, wherein the physical quantity of the link comprises a distance of the link, and the unit physical quantity comprises a distance by which the signal originating from the start node moves in the link in the unit of time.

5. A path selection device according to claim 4, wherein as the distance of the link, a value obtained by multiplication with a coefficient that is proportional to a reciprocal of a transmission speed of the link is used.

6. A path selection device according to claim 2, wherein in association with each link in the network, operations of a counter corresponding to one direction along the link and a counter corresponding to another direction than the one direction are included in the simulation.

7. A non-transitory tangible medium storing a program for causing a computer to function as:
network information acquisition means for acquiring, by a start node which is a source of an oscillation or a signal to be simulated regarding a transmission process in a network and is one node in the network, coupled state information of the network indicating a connectibility of nodes in the network from the network;
network state analysis means for determining, by an arithmetic unit of the start node executing the simulation in accordance with a computational model constructed based on the coupled state information, when n (n is a natural number) links connected to the one node in the network are called a first link, a second link, . . . , an n-th link in order from a link that has transmitted the oscillation or the signal first to the one node, at least the first link for each of the nodes in the network; and
network path selection means for selecting by the start node a path that extends from a target node, which is one node in the network other than the start node, to the start node via the first link of intermediate nodes as a desired path between the start node and the target node, wherein the computational model comprises a computational model in which the nodes in the network are likened to oscillators that oscillate in accordance with an equation defined based on the coupled state information and transmit the oscillation to each other via a link between the nodes, wherein the start node is formed into the computational model as an oscillator that moves as a source of the oscillation, wherein a physical phase of each of the oscillators is simulated, to thereby simulate transmission of the oscillation from the oscillator of the start node to other oscillators, and wherein in order to detect the transmission of the oscillation in one direction along a link, a motion of a virtual oscillator that does not correspond to the nodes is included in the simulation.

8. A non-transitory tangible medium storing a program for causing a computer to function as:

network information acquisition means for acquiring, by a start node which is a source of an oscillation or a signal to be simulated regarding a transmission process in a network and is one node in the network, coupled state information of the network indicating a connectibility of nodes in the network from the network;

network state analysis means for determining, by an arithmetic unit of the start node executing the simulation in accordance with a computational model constructed based on the coupled state information, when n (n is a natural number) links connected to the one node in the network are called a first link, a second link, . . . , an n-th link in order from a link that has transmitted the oscillation or the signal first to the one node, at least the first link for each of the nodes in the network; and network path selection means for selecting by the start node a path that extends from a target node, which is one node in the network other than the start node, to the start node via the first link of intermediate nodes as a desired path between the start node and the target node, wherein the program is a computational model in which every link in the network is divided into a number of sections, the number being determined based on a physical quantity regarding the link, and one of the number of sections and a unit of time are correlated to simulate a propagation state of the signal in the network.

9. A non-transitory tangible medium according to claim 8, wherein the computational model approximates the physical quantity of each link as an integer multiple of a value indicating a unit physical quantity, which is the physical quantity regarding one link per unit of time, and models movement of the signal assuming that the physical quantity changes discretely in steps of the unit physical quantity every time the unit of time is elapsed, and wherein a counter which starts counting from a time when the signal enters a corresponding link, increments a count by one every time the unit of time is elapsed, and counts up to a value corresponding to the physical quantity of the corresponding link is provided so as to correspond to each link of the network.

10. A non-transitory tangible medium according to claim 9, wherein the physical quantity of the link comprises a distance of the link, and the unit physical quantity comprises a distance by which the signal originating from the start node moves in the link in the unit of time.

11. A non-transitory tangible medium according to claim 10, wherein as the distance of the link, a value obtained by multiplication with a coefficient that is proportional to a reciprocal of a transmission speed of the link is used.

12. A non-transitory tangible medium according to claim 8, wherein in association with each link in the network, operations of a counter corresponding to one direction along the link and a counter corresponding to another direction than the one direction are included in the simulation.

13. A network system, comprising a plurality of nodes with any one of computers being a node, the any one of computers comprising the path selection device according to claim 1, and a non-transitory tangible medium storing a program for causing a computer to function as:

network information acquisition means for acquiring, by a start node which is a source of an oscillation or a signal to be simulated regarding a transmission process in a network and is one node in the network, coupled state information of the network indicating a connectibility of nodes in the network from the network;

network state analysis means for determining, by an arithmetic unit of the start node executing the simulation in accordance with a computational model constructed based on the coupled state information, when n (n is a natural number) links connected to the one node in the network are called a first link, a second link, . . . , an n-th link in order from a link that has transmitted the oscillation or the signal first to the one node, at least the first link for each of the nodes in the network; and network path selection means for selecting by the start node a path that extends from a target node, which is one node in the network other than the start node, to the start node via the first link of intermediate nodes as a desired path between the start node and the target node, wherein the computational model comprises a computational model in which the nodes in the network are likened to oscillators that oscillate in accordance with an equation defined based on the coupled state information and transmit the oscillation to each other via a link between the nodes, wherein the start node is formed into the computational model as an oscillator that moves as a source of the oscillation, wherein a physical phase of each of the oscillators is simulated, to thereby simulate transmission of the oscillation from the oscillator of the start node to other oscillators, and wherein in order to detect the transmission of the oscillation in one direction along a link, a motion of a virtual oscillator that does not correspond to the nodes is included in the simulation, and operating in accordance with the program stored in the non-transitory tangible medium.

14. A network system according to claim 13, wherein each of the plurality of nodes determines, each time information is transmitted to nodes other than the node, when the node is the start node, a desired path between the start node and the target node.

15. A path selection method, comprising the steps of:

acquiring, by a start node which is a source of an oscillation or a signal to be simulated regarding a transmission process in a network and is one node in the network, coupled state information of the network indicating a connectibility of nodes in the network from the network;

determining, by an arithmetic unit of the start node executing the simulation in accordance with a computational model constructed based on the coupled state information, when n (n is a natural number) links connected to the one node in the network are called a first link, a second link, . . . , an n-th link in order from a link that has transmitted the oscillation or the signal first to the one node, at least the first link for each of the nodes in the network; and selecting, by the start node, a path that extends from a target node, which is one node in the network other than the start node, to the start node via the first link of intermediate nodes as a desired path between the start node and the target node, wherein the computational model comprises a computational model in which the nodes in the network are likened to oscillators that oscillate in accordance with an equation defined based on the coupled state information and transmit the oscillation to each other via a link between the nodes, wherein the start node is formed into the computational model as an oscillator that moves as a source of the oscillation, wherein a physical phase of each of the oscillators is simulated, to thereby simulate transmission of the oscillation from the oscillator of the start node to other oscillators, and wherein in order to detect the transmission of the oscillation in one direction along a link, a motion of a virtual oscillator that does not correspond to the nodes is included in the simulation.

16. A path selection method, comprising the steps of:

acquiring, by a start node which is a source of an oscillation or a signal to be simulated regarding a transmission process in a network and is one node in the network, coupled state information of the network indicating a connectibility of nodes in the network from the network;

determining, by an arithmetic unit of the start node executing the simulation in accordance with a computational model constructed based on the coupled state information, when n (n is a natural number) links connected to the one node in the network are called a first link, a second link, . . . , an n-th link in order from a link that has transmitted the oscillation or the signal first to the one node, at least the first link for each of the nodes in the network; and selecting, by the start node, a path that extends from a target node, which is one node in the network other than the start node, to the start node via the first link of intermediate nodes as a desired path between the start node and the target node, wherein the path selection method is a computational model in which every link in the network is divided into a number of sections, the number being determined based on a physical quantity regarding the link, and one of the number of sections and a unit of time are correlated to simulate a propagation state of the signal in the network.

17. A path selection method according to claim 16, wherein the computational model approximates the physical quantity of each link as an integer multiple of a value indicating a unit physical quantity, which is the physical quantity regarding one link per unit of time, and models movement of the signal assuming that the physical quantity changes discretely in steps of the unit physical quantity every time the unit of time is elapsed, and wherein a counter which starts counting from a time when the signal enters a corresponding link, increments a count by one every time the unit of time is elapsed, and counts up to a value corresponding to the physical quantity of the corresponding link is provided so as to correspond to each link of the network.

18. A path selection method according to claim 17, wherein the physical quantity of the link comprises a distance of the link, and the unit physical quantity comprises a distance by which the signal originating from the start node moves in the link in the unit of time.

19. A path selection method according to claim 18, wherein as the distance of the link, a value obtained by multiplication with a coefficient that is proportional to a reciprocal of a transmission speed of the link is used.

20. A path selection method according to claim 16, wherein in association with each link in the network, operations of a counter corresponding to one direction along the link and a counter corresponding to another direction than the one direction are included in the simulation.

21. A network system, comprising a plurality of nodes with any one of computers being a node, the any one of computers comprising the path selection device according to claim 2, and a non-transitory tangible medium storing a program for causing a computer to function as:

network information acquisition means for acquiring, by a start node which is a source of an oscillation or a signal to be simulated regarding a transmission process in a network and is one node in the network, coupled state information of the network indicating a connectibility of nodes in the network from the network;

network state analysis means for determining, by an arithmetic unit of the start node executing the simulation in accordance with a computational model constructed based on the coupled state information, when n (n is a natural number) links connected to the one node in the network are called a first link, a second link, . . . , an n-th link in order from a link that has transmitted the oscillation or the signal first to the one node, at least the first link for each of the nodes in the network; and network path selection means for selecting by the start node a path that extends from a target node, which is one node in the network other than the start node, to the start node via the first link of intermediate nodes as a desired path between the start node and the target node, wherein the program is a computational model in which every link in the network is divided into a number of sections, the number being determined based on a physical quantity regarding the link, and one of the number of sections and a unit of time are correlated to simulate a propagation state of the signal in the network, and operating in accordance with the program stored in the non-transitory tangible medium.

22. A network system according to claim 21, wherein each of the plurality of nodes determines, each time information is transmitted to nodes other than the node, when the node is the start node, a desired path between the start node and the target node.

* * * * *